United States Patent
Lanzenberger

(10) Patent No.: US 11,097,982 B2
(45) Date of Patent: Aug. 24, 2021

(54) BATCH FOR PRODUCING AN UNSHAPED REFRACTORY CERAMIC PRODUCT, METHOD FOR PRODUCING AN UNSHAPED REFRACTORY CERAMIC PRODUCT, AND AN UNSHAPED REFRACTORY CERAMIC PRODUCT PRODUCED THEREBY

(71) Applicant: Refractory Intellectual Property GmbH & Co. KG, Vienna (AT)

(72) Inventor: Ronald Lanzenberger, Vienna (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 12 days.

(21) Appl. No.: 16/476,709

(22) PCT Filed: Oct. 19, 2017

(86) PCT No.: PCT/EP2017/076677
§ 371 (c)(1),
(2) Date: Jul. 9, 2019

(87) PCT Pub. No.: WO2018/137801
PCT Pub. Date: Aug. 2, 2018

(65) Prior Publication Data
US 2019/0375686 A1 Dec. 12, 2019

(30) Foreign Application Priority Data
Jan. 27, 2017 (EP) ..................... 17153430

(51) Int. Cl.
C04B 35/04 (2006.01)
C04B 35/626 (2006.01)
C04B 35/636 (2006.01)
C04B 35/64 (2006.01)

(52) U.S. Cl.
CPC .......... *C04B 35/04* (2013.01); *C04B 35/6264* (2013.01); *C04B 35/636* (2013.01); *C04B 35/64* (2013.01); *C04B 2235/321* (2013.01); *C04B 2235/3206* (2013.01); *C04B 2235/3208* (2013.01); *C04B 2235/349* (2013.01); *C04B 2235/422* (2013.01); *C04B 2235/5208* (2013.01)

(58) Field of Classification Search
CPC ... C04B 35/04; C04B 35/6264; C04B 35/636; C04B 2235/3206; C04B 2235/321; C04B 2235/3201
See application file for complete search history.

(56) References Cited

U.S. PATENT DOCUMENTS

| | | | | |
|---|---|---|---|---|
| 3,047,411 A | * | 7/1962 | Chantler et al. | C04B 28/26 106/618 |
| 4,119,487 A | * | 10/1978 | Tessler | C08B 31/12 162/175 |
| 4,708,745 A | * | 11/1987 | Schonhausen | C04B 40/0028 106/645 |
| 2008/0179771 A1 | * | 7/2008 | Miao | C04B 38/0006 264/44 |

FOREIGN PATENT DOCUMENTS

| | | | | |
|---|---|---|---|---|
| CN | 101367659 B | * | 2/2009 | ............. C04B 35/66 |
| CN | 106270366 A | | 1/2017 | |
| DE | WO/2014/198433 | * | 12/2014 | ........ C04B 2111/763 |
| GB | 1486352 A | | 9/1977 | |
| WO | 2018137801 A1 | | 8/2018 | |

* cited by examiner

*Primary Examiner* — Noah S Wiese
(74) *Attorney, Agent, or Firm* — Medley, Behrens & Lewis, LLC

(57) ABSTRACT

The invention relates to a batch for producing an unshaped refractory ceramic product, to a method for producing an unshaped refractory ceramic product, and to an unshaped refractory ceramic product produced by the method.

11 Claims, No Drawings

BATCH FOR PRODUCING AN UNSHAPED REFRACTORY CERAMIC PRODUCT, METHOD FOR PRODUCING AN UNSHAPED REFRACTORY CERAMIC PRODUCT, AND AN UNSHAPED REFRACTORY CERAMIC PRODUCT PRODUCED THEREBY

The invention relates to a batch for producing an unshaped refractory ceramic product, to a method for producing an unshaped refractory ceramic product, and to an unshaped refractory ceramic product produced by the method.

The term "refractory ceramic product" as used in the context of the invention in particular describes refractory products with a service temperature of more than 600° C., and preferably refractory materials as defined in DIN 51060:2000-6, i.e. materials with a pyrometric cone equivalent>SC 17. The pyrometric cone equivalent can in particular be determined in accordance with DIN EN 993-12:1997-06.

As is known, the term "batch" refers to a composition formed of one or more components or raw materials by means of which a refractory ceramic product can be produced by means of a temperature treatment, i.e. in particular by means of ceramic firing.

Refractory ceramic products are known in many forms. Refractory ceramic products can thus be provided in the form of shaped products, for example bricks, or in the form of unshaped refractory products, or what are known as "masses".

In contrast to shaped refractory products, which obtain a certain geometry by shaping, batches for producing unshaped refractory products without prior shaping are applied directly to a surface at their place of use in an assembly that can be acted on with temperature, for example a furnace, without any prior shaping. Once the unshaped batch has been dried and hardened, it is acted on with temperature by heating the assembly and in so doing forms a refractory ceramic product.

Unshaped refractory ceramic products in the form of what are known as gunning masses are also known. Gunning masses are used for the maintenance and repair of regions of the refractory lining of a furnace in which the refractory lining is exposed to particular wear. In particular, gunning masses are used for the maintenance and repair of the refractory lining of furnace assemblies in steelworks, for example converters, ladles or tundishes.

With use of a gunning mass, the batch provided for production of the gunning mass is mixed with water and then sprayed onto the region of the refractory lining of the furnace to be maintained or repaired.

In order to spray gunning masses onto the refractory lining of a furnace, spraying machines or centrifuges are used in particular. With use of spraying machines the dry batch is firstly conveyed through a tube into a spraying lance by means of compressed air, where the batch is mixed with water. The batch mixed accordingly with water is then sprayed by means of the lance onto the regions of the refractory lining of the furnace that are to be repaired or maintained. With use of centrifuges the dry batch is likewise firstly mixed with water and then transported on a horizontal spinner, which centrifuges or sprays the batch mixed with water onto the regions of the refractory lining of the furnace that are to be repaired or maintained.

In principle, gunning masses have proven their worth in the maintenance and repair of highly stressed furnace regions. A problem with the use of gunning masses, however, is routinely the mechanical rebound experienced by the gunning masses as they contact the surface of the furnace to be maintained or repaired. Due to this rebound, significant proportions of the gunning mass sprayed onto the surface can detach and fall into the furnace assembly. These proportions of rebounding gunning mass, which can be up to 30% of the sprayed gunning mass, are then no longer available for the repair or maintenance of the furnace. In particular from a cost viewpoint, the rebound of gunning masses is therefore disadvantageous.

There has therefore been no shortage of tests to provide technologies by means of which the rebound of gunning masses can be reduced. Particular focus is placed here in particular on the grain size of the components of the batch of the gunning mass, since it has been found that the grain size of the components can have an influence on the rebound behaviour of the gunning mass. However, the rebound of gunning masses in many cases cannot be reduced to the desired extent by a certain grain size alone.

In particular, in order to reduce the rebound of a gunning mass, the grain size of the components also cannot be varied arbitrarily, since the grain size of the components of the gunning mass also has a significant influence on the sintering properties of the gunning mass.

The object of the invention is to provide a batch for producing an unshaped refractory ceramic product, in particular an unshaped refractory ceramic product in the form of a gunning mass, which has a low rebound. In particular, the rebound behaviour of the gunning mass should be independent of the grain size of the batch components. The batch should also have good initial tack, i.e. good adhesion to the regions that are to be repaired. The batch should also have good sintering properties.

In order to achieve this object, a batch is provided for producing an unshaped refractory ceramic product, which batch has the following features:

The batch comprises the following components:
  at least 60 mass % of a main component in the form of at least one raw material based on magnesia;
  a component in the form of at least one chemically modified starch ether;
  a component in the form of at least one water-soluble chemical binder;

the batch comprises the following substances in the following mass proportions:
  less than 10 mass % calcium oxide;
  less than 10 mass % carbon.

It has surprisingly been found in accordance with the invention that the batch according to the invention when used as a gunning mass has only a low rebound. In particular, it has been found in accordance with the invention that by means of a batch according to the invention a gunning mass can be produced which has a significantly improved rebound behaviour compared to gunning masses according to the prior art, in which the rebound behaviour is set by way of the grain size. The batch also has good initial tack. The batch according to the invention also has good sintering properties.

The batch according to the invention is used to produce an unshaped refractory ceramic product in the form of a basic unshaped refractory ceramic product, in particular to produce a basic gunning mass. In particular, the batch according to the invention is used to produce a sintered basic gunning mass.

The batch according to the invention is based on a refractory main component in the form of at least one raw material based on magnesia (i.e. magnesium oxide, MgO). The at least one raw material based on magnesia of the batch according to the invention is preferably at least one of the following raw materials: sintered magnesia or fused magnesia. The main component is particularly preferably provided in the form of sintered magnesia.

The main component is preferably provided in a grain size of at most 5 mm. The main component is particularly preferably provided to an extent of 100 mass %, relative to the total mass of the main component, in a grain size of at most 5 mm or at most 3 mm. The grain size can be determined in particular according to DIN 66165-1:2015-10.

The main component is provided in the batch in a proportion of at least 60 mass %, relative to the total mass of the batch, i.e. for example also in a proportion of at least 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91 or 92 mass %. The main component is preferably provided in the batch in a proportion of at least 65 mass % or at least 70 mass %, and particularly preferably in a proportion of at least 75, 80 or 85 mass %.

All of the values in mass % provided herein are based in each case on the total mass of the batch, unless otherwise specified in individual cases.

For example, the main component can be provided in the batch in a proportion of at most 98%, i.e. for example also in a proportion of at most 97, 96, 95, 94 or 93 mass %. The main component can be provided in the batch particularly preferably in a proportion of at most 97 mass %.

It has surprisingly been found in accordance with the invention that the rebound of a gunning mass can be drastically reduced if the gunning mass contains a proportion of at least one chemically modified starch ether. Here, it has been found that the rebound-reducing effect of the modified starch ether is provided already when this is provided in very small amounts in the batch. In this regard, the chemically modified starch ether can already develop a rebound-reducing effect in the gunning mass if it is present in a proportion of just at least 0.01 mass %. In this regard, it can be provided that the component in the form of the at least one chemically modified starch ether is present in the batch in a proportion of at least 0.01 mass %, i.e. for example also in a proportion of at least 0.02 or 0.03 or 0.04 or 0.05 or 0.06 or 0.07 or 0.08 or 0.09 or 0.10 or 0.11 or 0.12 or at least 0.13 mass %.

It has also been found in accordance with the invention that the rebound proportion of a gunning mass produced from the batch according to the invention can be reduced to less than 15 mass %, sometimes also to less than 10 mass %, relative to the total sprayed mass of a gunning mass produced from a batch according to the invention.

It has been found in accordance with the invention that the rebound-reducing effect of the at least one modified starch ether in the batch can be reduced if the at least one modified starch ether is provided in the batch in a proportion of more than 1.0 mass %. The inventors suspect that the at least one chemically modified starch ether thickens a gunning mass excessively if it is provided in a batch in proportions of more than 1.0 mass %, such that the gunning mass is no longer viscous enough to adhere to the surface. On this basis, it is preferably provided that the component in the form of the at least one chemically modified starch ether is provided in the batch in a proportion of at most 1.0 mass %, i.e. for example also in a proportion of at most 0.9 or 0.8 or 0.7 or 0.6 or 0.5 or 0.4 or 0.3 or 0.2 or 0.18 or 0.16 or at most 0.15 mass %.

In principle, the batch according to the invention can contain any chemically modified starch ether. In principle, any starch ether can be provided as the base material of the chemically modified starch ether, for example as described in Römpp's Chemistry Lexicon, 9th edition, Georg Thieme Verlag, Stuttgart, 1992, ISBN 3-13-735009-3, page 4272 under the heading "Stärkeether" ("starch ether"). On this basis, starch derivatives of the general formula

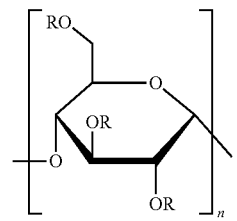

with R=H, alkyl or aralkyl can be provided as the base material of the chemically modified starch ether.

The at least one chemically modified starch ether is particularly preferably provided in the form of at least one starch ether that has been chemically modified to such an extent that a starch ether as described above has at least one chemical group selected from the following group: hydroxyalkyl, carboxyalkyl, hydroxyalkyl-carboxyalkyl, carbamoyl or cyanoalkyl.

In this regard the at least one chemically modified starch ether can be at least one of the following chemically modified starch ethers: hydroxyalkyl starch ether, carboxyalkyl starch ether, hydroxyalkyl-carboxyalkyl starch ether, carbamoyl starch ether or cyanoalkyl starch ether. The chain length of the alkyl group can be in particular in the range of 1-20 carbon atoms, preferably in the range of 1-10 carbon atoms, and particularly preferably in the range of 1-5 carbon atoms.

The component in the form of the at least one water-soluble chemical binder can be at least one water-soluble chemical binder that is known as a water-soluble chemical binder for gunning masses from the prior art, i.e. for example a sulphate-based, phosphate-based or silicate-based binder. In this regard the at least one water-soluble chemical binder for example can be at least one of the following binders: at least one water-soluble sulphate, at least one water-soluble phosphate, or at least one water-soluble silicate.

In this regard the water-soluble chemical binder is preferably provided in the form of inorganic water-soluble chemical binders.

A water-soluble chemical binder in the form of a silicate can be provided in particular in the form of water glass powder.

A water-soluble chemical binder in the form of a phosphate can be provided for example in the form of sodium polyphosphate.

A water-soluble chemical binder in the form of a sulphate can be provided for example in the form of at least one of the following sulphates: aluminium sulphate, sodium hydrogen sulphate, Epsom salt or kieserite.

At least one or both of the following water-soluble chemical binders is/are particularly preferably present as water-soluble chemical binder: water glass powder or aluminium sulphate.

As is known, the purpose of water-soluble chemical binders in gunning masses lies in the fact that these binders chemically bond after the addition of water and provide the batch or the gunning mass produced from the batch with a certain strength, until the refractory main component sinters and hereby a ceramic bond forms on account of the application of temperature to the gunning mass.

The component in the form of the at least one water-soluble chemical binder can be provided in the batch for example in a proportion of at least 1 mass %, i.e. for example also in a proportion of at least 2, 3 or 4 mass %. The component in the form of the at least one water-soluble chemical binder can also be provided in the batch in a proportion of at most 10 mass %, i.e. for example also in a proportion of at most 9, 8, 7 or 6 mass %.

It has surprisingly been found within the scope of the invention that the rebound of a gunning mass produced from the batch according to the invention can increase with an increasing proportion of calcium oxide in the batch. In this regard it is provided in accordance with the invention that the batch according to the invention comprises calcium oxide in a proportion of less than 10 mass %. Since the rebound of a gunning mass produced from the batch according to the invention decreases with a decreasing proportion of calcium, it can be provided in particular that the proportion of calcium oxide in the batch is also less than 9, 8, 7, 6, 5, 4, 3, 2 or less than 1 mass %. The proportion of calcium oxide in the batch is preferably less than 9 mass %. The proportion of calcium oxide in the batch is particularly preferably less than 8 mass %.

The reason why the rebound of a gunning mass produced from the batch according to the invention increases with an increasing proportion of calcium oxide has not yet been fully explained. The inventors suppose that it is down to reactions between calcium ions and chemically reactive groups of the modified starch ether, which reduce the thickening effect and therefore the rebound-reducing effect of the modified starch ether.

Calcium oxide (CaO) can also be introduced into the batch by way of natural impurities of the main component. If the main component is therefore provided in the form of at least one of the raw materials constituted by sintered magnesia or fused magnesia, it can be provided in particular in accordance with the invention that the used sintered magnesia or fused magnesia has maximum contents of calcium oxide. In particular it can be provided that the total mass of calcium oxide of the main component is less than 10 mass %, i.e. for example also less than 9, 8, 7, 6, 5, 4, 3, 2 or 1 mass %, relative to the total mass of the main component.

It is known from refractory technology that proportions of CaO with proportions of $Al_2O_3$ in the batch can form low-melting calcium aluminate phases, and that, with proportions of MgO and $SiO_2$ in the batch, low-melting calcium magnesium silicate phases can form, which can permanently worsen the refractory properties of the product formed from the batch. The batch can therefore comprise at least one component for setting the basicity, that is to say the ratio of CaO, MgO and $SiO_2$ to one another in the batch. The batch can comprise at least one of the following raw materials as components of this kind for setting the basicity of the batch: limestone ($CaCO_3$), dolomite ($CaCO_3.MgCO_3$), doloma (CaO.MgO), magnesite ($MgCO_3$) or olivine ($(Mg,Fe)_2SiO_4$). The batch preferably comprises at least one of the following raw materials in order to set the basicity: limestone or dolomite. The batch particularly preferably comprises a raw material in the form of limestone in order to set the basicity.

These raw materials for setting the basicity of the batch can be provided in the batch for example in a proportion of less than 40 mass %, i.e. for example also in a proportion of at most 39, 35, 30, 25, 20, 19, 18, 17, 16, 15, 14, 13, 12, 11, 10, 9, 8, 7 or 6 mass %. Insofar as corresponding maximum proportions of these raw materials are provided in the batch, it is ensured that the proportion of Cao in the batch can be set to less than 12 mass %, or less than 9 mass %, so that the rebound properties of the batch are not disadvantageously influenced by these further raw materials. The raw materials for setting the basicity of the batch can also be present in the batch for example in a proportion of at least 1 mass %, i.e. for example also in a proportion of at least 2, 3, 4 or 5 mass %. In order to set a suitable basicity of the batch, it can be provided that the raw materials for setting the basicity of the batch are provided in the batch for example in a proportion of more than 1 mass %, i.e. for example also in a proportion of more than 5, 10, 15, 20, 25 or more than 30 mass %.

It has been found in accordance with the invention that the above-described worsening of the properties of the batch according to the invention accompanying an increase of the proportion of calcium oxide (CaO) in the batch, i.e. in particular also the accompanying increased rebound of a gunning mass produced from the batch according to the invention, is dependent solely on the proportion of calcium oxide (CaO) in the batch, and not on the proportion of calcium carbonate ($CaCO_3$) in the batch. In this regard the batch for example can also comprise higher proportions of limestone or dolomite and lower proportions of doloma.

So as not to negatively influence the good sintering properties of the batch according to the invention on account of any oxidation reactions of carbon, it is provided in accordance with the invention that the batch has a proportion of carbon of less than 10 mass %. In particular, it can be provided that the batch according to the invention has a proportion of carbon of less than 9, 8, 7, 6, 5, 4, 3, 2 or 1 mass %.

With accordingly low proportions of carbon in the batch, it is ensured that any oxidation reactions of carbon in the batch do not negatively affect the sintering behaviour thereof.

In this context the term "carbon" means only free carbon, i.e. carbon which is not present in the form of an inorganic or organic compound. In this regard carbon in the sense according to the invention is at least one of the substances constituted by graphite or carbon black, for example.

For example, proportions of carbon that are introduced into the batch by way of the at least one chemically modified starch ether, or any proportions of carbon provided in the batch in carbonate form, for example carbon contents in magnesium carbonate or calcium carbonate, do not constitute carbon in this context.

In order to influence the plastic properties of the batch and of the gunning mass producible therefrom, the batch can comprise a component in the form of at least one clay. In particular, the batch for example can comprise at least one plastic clay. The use of clay in gunning masses is known in order to set the plastic properties of gunning masses. Reference can be made in this regard to the clays known from the prior art.

A clay based on aluminosilicate, i.e. based on the oxides $Al_2O_3$ and $SiO_2$, is particularly preferably present in the batch according to the invention. In particular, a clay based on clay minerals of the kaolin group can be provided.

A component in the form of at least one clay can be provided in the batch according to the invention, for example in a proportion of at least 0.1 mass % in the batch, i.e. for example also in a proportion of at least 0.2 or 0.5 or 1.0 or 1.5 or 2.0 mass %. This component for example can also be provided in the batch in a proportion of at most 5 mass %, i.e. for example also in a proportion of at most 4.0 or 3.0 mass %.

The batch according to the invention can comprise a component in the form of fibres, in particular for example in the form of organic fibres. The use of organic fibres in gunning masses is known. Organic fibres are used in gunning masses in particular in order to act as a moisture extraction aid at the time of drying and heating. Fibres in the form of cellulose fibres can particularly preferably be provided in the batch according to the invention. For example, the component in the form of fibres can be provided in the batch in a proportion of at least 0.05 mass %, i.e. for example also in a proportion of at least 0.1 or 0.2 or 0.3 or 0.4 mass %. This component for example can also be provided in a proportion of at most 1.0 mass %, i.e. for example also in a proportion of at most 0.9 or 0.8 or 0.7 or 0.6 mass %.

The rebound and sintering properties of a gunning mass produced from the batch according to the invention can react sensitively to the presence of further components provided in the batch in addition to the components discussed above. It can therefore be provided that the batch, besides the above-mentioned components, i.e. the main component, the component in the form of at least one chemically modified starch ether, the component in the form of at least one water-soluble chemical binder, the raw materials for setting the basicity of the batch, clay and fibres, also comprises further components merely in a proportion of less than 10 mass %, i.e. for example also in a proportion of less than 9, 8, 7, 6, 5, 4, 3, 2 or 1 mass %.

As mentioned above, the main component can be provided in the batch in particular in the form of sintered magnesia or fused magnesia, in particular in highly pure form, so that, besides magnesia, only small proportions of further oxides can be introduced into the batch by way of the raw materials based on magnesia. In particular it can be provided that the following oxides are provided in the batch in proportions lower than the mass proportions specified below, wherein the individual oxides can be provided in the batch, individually or in combination, in each case below the specified mass proportions:

$SiO_2$: less than 10 mass %, less than 5 mass % or less than 3 mass %;
$Fe_2O_3$: less than 8 mass %, less than 5 mass % or less than 3 mass %;
$Al_2O_3$: less than 3 mass %;
$Cr_2O_3$: less than 2 mass % or less than 1 mass %;
$Na_2O$: less than 2 mass % or less than 1 mass %.

The invention also relates to a method for producing an unshaped refractory ceramic product comprising the following steps:
providing a batch according to the invention;
mixing the batch with water;
applying the batch mixed with water to a surface;
firing the batch applied to the surface to form an unshaped refractory ceramic product.

In this regard, the method according to the invention corresponds to the method known from the prior art for producing a gunning mass and for application thereof to the surface of a furnace region in order to maintain or repair this.

Here, the batch according to the invention is firstly provided and mixed with water in order to produce a gunning mass. This gunning mass is then applied to a surface, in particular for example a region of the refractory lining of a furnace that is to be maintained or repaired. The batch applied accordingly to the surface is then fired to form a refractory ceramic product by heating the furnace and hereby acting on the batch with temperature in such a way that the batch is sintered and fired to form a refractory ceramic product.

Before the batch is processed, the batch can be mixed with water, for example in a mixing nozzle.

By mixing the batch with water, a gunning mass is obtained which has only a low rebound when it is sprayed onto a surface and remains adhered to the surface to a large extent.

The batch can be mixed with a proportion of water in the range for example of from 1 to 15 mass %, i.e. for example also with a proportion of at least 2, 3 or 4 mass %, and for example with a proportion of at most 14, 13, 12, 11, 10, 9, 8, 7 or 6 mass %, in each case relative to the total mass of the batch without water.

The water-soluble chemical binders in the batch cure after the mixing of the batch with water, so that the batch mixed with water and applied or sprayed onto the surface cures on the surface.

The batch applied to the surface is acted on with temperature by the heating of the furnace and in so doing is subjected to ceramic firing. In particular, the batch is acted on with such a temperature that the raw materials of the main component sinter and the batch therefore sinters to form a refractory ceramic body on account of the ceramic firing. The batch can preferably be acted on with a temperature in the range of from 1250 to 1750° C.

The method according to the invention can particularly preferably be used to apply the batch according to the invention, mixed with water, to a surface of a converter, a ladle or an electric arc furnace.

The invention also relates to an unshaped refractory ceramic product produced by a method according to the invention.

Further features of the invention will emerge from the claims and the exemplary embodiment of the invention described hereinafter.

All features of the invention can be combined arbitrarily with one another, either individually or in combination.

An exemplary embodiment of the invention will be described in greater detail hereinafter.

The exemplary embodiment relates to a batch for producing an unshaped refractory ceramic product in the form of a gunning mass.

The batch has the following components in the following mass proportions, in each case relative to the total mass of the batch:

a main component in the form of sintered magnesia: 92.65 mass %;
a component in the form of at least one chemically modified starch ether in the form of the following chemically modified starch ether: hydroxyalkyl-carboxyalkyl starch ether: 0.15 mass %;
a component in the form of at least one water-soluble chemical binder in the form of the two following water-soluble chemical binders:
water glass: 3.5 mass %; and
aluminium sulphate: 1.0 mass %;
a component in the form of clay in the form of aluminosilicate clay: 2.5 mass %;
a component in the form of fibres in the form of cellulose fibres: 0.2 mass %.

Calcium oxide and carbon were provided in this batch in the following mass proportions:
calcium oxide: 3.1 mass %;
carbon: less than 0.1 mass %.

The following oxides were also provided in the batch, in each case in the following mass proportions:
MgO: 89.4 mass %;
$SiO_2$: 5.5 mass %;
$Fe_2O_3$: 0.5 mass %;
$Al_2O_3$: 0.8 mass %;
$Cr_2O_3$: less than 0.1 mass %;
$Na_2O$: 0.7 mass %.

A gunning mass was then produced from the accordingly provided batch, and this gunning mass was sprayed onto the refractory lining of an electric arc furnace (EAF) for repair thereof.

To this end the batch was firstly introduced in the form of a dry mixture into a spraying machine and was conveyed through a tube to a spraying lance by means of compressed air. The water was injected into the batch in the spraying lance in a proportion of 15 mass % relative to the batch without water. As a result of the corresponding injection of water into the batch, a gunning mass was obtained. The gunning mass obtained accordingly was sprayed by means of the spraying lance onto the refractory lining of the EAF to be repaired. Here, the gunning mass had only a very low rebound of approximately 15%. A curing reaction of the water-soluble chemical binder of the batch was initiated on account of the water, so that the gunning mass sprayed onto the refractory lining cured. The EAF was then heated, whereby the cured gunning mass was acted on with a temperature of approximately 1660° C. and the sintered magnesia thus sintered in such a way that a sintered basic refractory ceramic product was obtained from the gunning mass.

The invention claimed is:

1. A batch for producing an unshaped refractory ceramic product which has the following features:
   1.1 the batch comprises the following components:
      1.1.1 at least 60 mass % of a main component in the form of at least one raw material based on magnesia;
      1.1.2 a component in the form of at least one chemically modified starch ether; and
      1.1.3 a component in the form of at least one water-soluble chemical binder;
   1.2 the batch comprises the following substances in the following mass proportions:
      1.2.1 less than 10 mass % calcium oxide; and
      1.2.2 less than 10 mass % carbon.

2. The batch according to claim 1 with a main component in the form of at least one of the following raw materials: sintered magnesia or fused magnesia.

3. The batch according to claim 1, with a proportion of the main component in the range of from 60 to 98 mass %.

4. The batch according to claim 1, with the component in the form of the at least one chemically modified starch ether in the form of at least one of the following chemically modified starch ethers: hydroxyalkyl starch ether, carboxyalkyl starch ether, hydroxyalkyl-carboxyalkyl starch ether, carbamoyl starch ether or cyanoalkyl starch ether.

5. The batch according to claim 1, with a proportion of the component in the form of the at least one chemically modified starch ether in the range of from 0.01 to 1.0 mass %.

6. The batch according to claim 1, with the component in the form of the at least one water-soluble chemical binder in the form of at least one of the following binders: at least one water-soluble sulphate, at least one water-soluble phosphate, or at least one water-soluble silicate.

7. The batch according to claim 1, with a proportion of 1 to less than 40 mass % of at least one of the following raw materials for setting the basicity of the batch: limestone, dolomite, doloma, magnesite or olivine.

8. The batch according to claim 1, with a component in the form of at least one clay.

9. The batch according to claim 1, with a component in the form of fibres.

10. A method for producing an unshaped refractory ceramic product comprising the following steps:
    10.1 providing a batch, the batch comprises:
       at least 60 mass % of a main component in the form of at least one raw material based on magnesia;
       a component in the form of at least one chemically modified starch ether; and
       a component in the form of at least one water-soluble chemical binder,
       wherein the batch comprises the following substances in the following mass proportions:
          less than 10 mass % calcium oxide; and
          less than 10 mass % carbon;
    10.2 mixing the batch with water;
    10.3 applying the batch mixed with water to a surface; and
    10.4 firing the batch applied to the surface to form an unshaped refractory ceramic product.

11. An unshaped refractory ceramic product produced by a method, the method comprising:
    11.1 providing a batch, the batch comprises:
       at least 60 mass % of a main component in the form of at least one raw material based on magnesia;
       a component in the form of at least one chemically modified starch ether; and
       a component in the form of at least one water-soluble chemical binder,
       wherein the batch comprises the following substances in the following mass proportions:
          less than 10 mass % calcium oxide; and
          less than 10 mass % carbon;
    11.2 mixing the batch with water;
    11.3 applying the batch mixed with water to a surface; and
    11.4 firing the batch applied to the surface to form an unshaped refractory ceramic product.

* * * * *